Feb. 16, 1943.   E. M. DONS ET AL   2,311,372
PROCESS OF EXTRACTING CONSTITUENTS OF HYDROCARBON LIQUIDS
Filed May 1, 1940   2 Sheets-Sheet 1
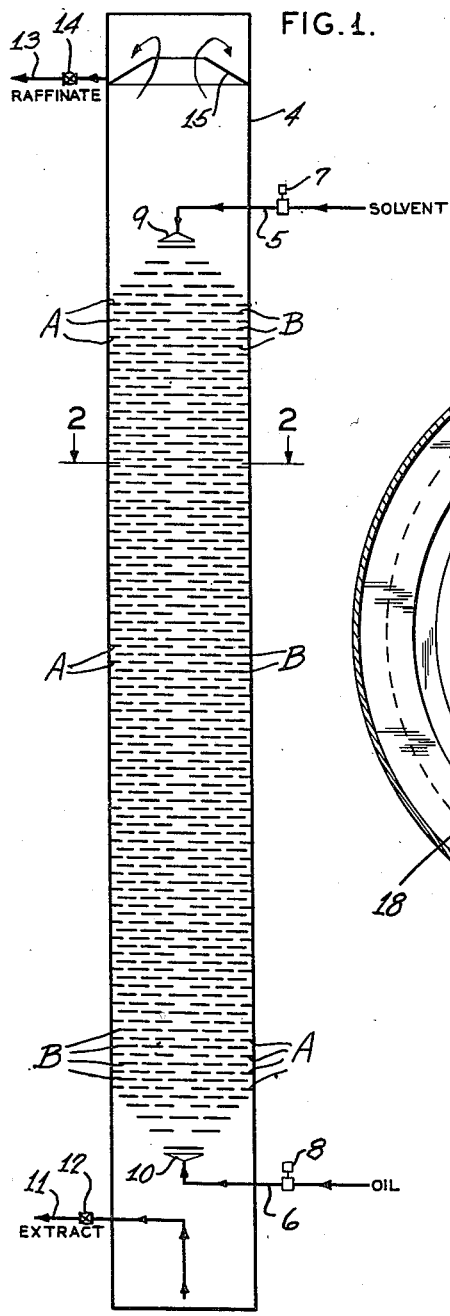
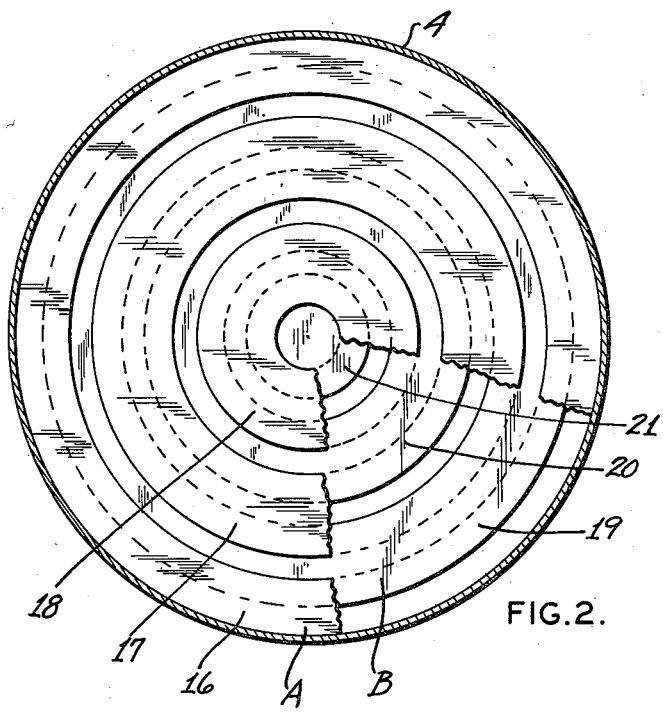
INVENTORS
E. M. DONS
O. G. MAURO
BY Albert J. McCauley
ATTORNEY.

Patented Feb. 16, 1943

2,311,372

UNITED STATES PATENT OFFICE 2,311,372

PROCESS OF EXTRACTING CONSTITUENTS OF HYDROCARBON LIQUIDS

Eddie M. Dons and Oswald G. Mauro, Tulsa, Okla., assignors to Mid-Continent Petroleum Corporation, Tulsa, Okla., a corporation of Delaware Application May 1, 1940, Serial No. 332,736

8 Claims. (Cl. 196—13)

This invention relates to processes of extracting hydrocarbon liquids, and more particularly to countercurrent processes wherein selective solvents are employed to extract selected constituents. For example, the invention may be employed in refining gasoline, kerosene, lubricating oils, fuel oils, etc., to separate paraffinic hydrocarbons from naphthenic and aromatic compounds, or to separate aromatic compounds from naphthenic compounds.

The important results of the new process include extremely high efficiency in the extracting operation, economy in the relatively small quantity of solvent required per barrel of oil treated, high capacity as measured in barrels per day, and low operating costs. We have shown how to accomplish all of these results while obtaining substantial saving in the initial cost of the extracting apparatus, as well as the advantage of having a simple extracting system located in a relatively small space.

An extremely high degree of efficiency is obtained by deliberately dividing counterflowing streams of solutions into numerous small streams, or films, which are subjected to numerous mixing, scrubbing and settling operations. In the preferred form of the invention, the small counterflowing streams intersect and mix with each other at frequent intervals, and the mixed constituents are free to settle at points between the adjacent mixing zones.

The frequent repetition of the mixing, scrubbing and settling operations, occurring in relatively small portions of the solvent and charging stock, produces a very remarkable increase in the efficiency of an extracting system, and we have found that the present invention also greatly increases the capacity of "throughput" per day. In other words, for an apparatus having a given volumetric content of oil and solvent, the capacity as measured in barrels per day will be relatively high. Consequently, very substantial commercial advantages appear in relatively low initial cost of the system, the relatively small space required for this compact system, and the increase in efficiency due to the unique manner in which the counterflowing streams are divided and transmitted through the numerous mixing and settling zones. The operating costs are also relatively low, as it is not necessary to employ numerous mechanically operated mixing devices, and the high efficiency of the mixing and settling operations enables the process to be carried out with a relatively small quantity of solvent per barrel of oil treated.

With the foregoing and other objects in view, the invention comprises the novel process hereinafter more specifically described and shown in the accompanying drawings, which illustrate one form of the invention. However, it is to be understood that the invention comprehends changes, variations and modifications within the scope of the claims hereunto appended.

Briefly stated, the preferred form of the invention is a countercurrent process including the steps of transmitting continuous streams of selective solvent and hydrocarbon liquid into different portions of an extracting chamber, dividing resultant solutions into annular rising and descending streams at various elevations in said chamber, the annular rising streams formed at each of said elevations being separated from each other, and causing annular descending streams of said solutions to flow across and descend between separated rising streams at each of said elevations.

Fig. 1 is a diagrammatical vertical section, drawn to a small scale, showing an extracting chamber equipped with numerous concentric baffle rings, arranged to repeatedly divide the rising and descending liquids into numerous annular streams.

Fig. 2 is a horizontal section on the line 2—2 in Fig. 1, drawn to a larger scale, and showing the arrangement of concentric rings at two adjacent elevations, portions of the upper rings being broken away to more clearly show the adjacent set of lower rings.

Figure 3:
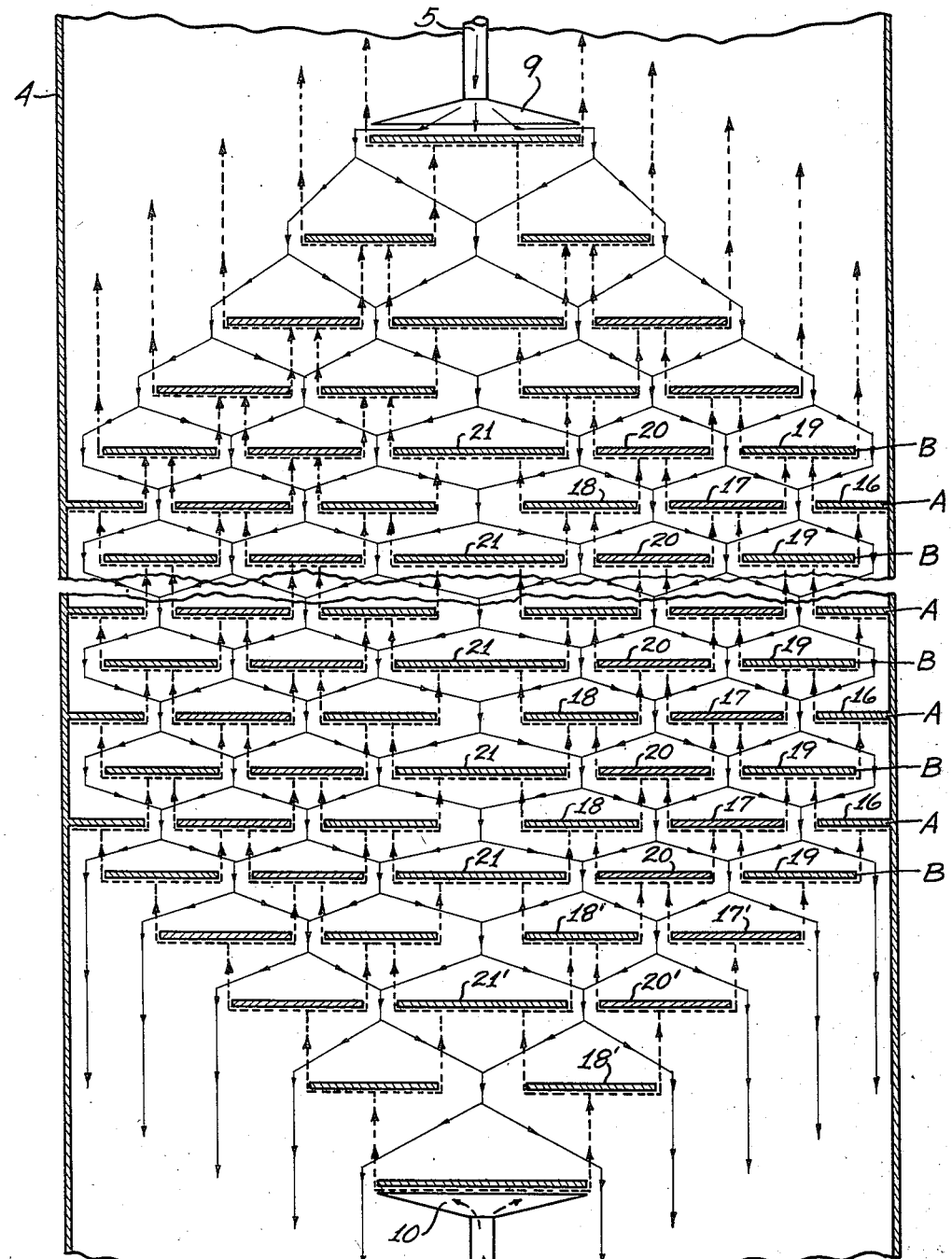
Fig. 3 is a diagrammatical vertical section drawn to a still larger scale, and showing conditions which exist near the upper and lower ends of the extracting chamber, the intermediate portions of the system being broken away.

As a simple illustration of a suitable extracting chamber, we have shown an upright cylindrical chamber, or column, 4 provided with an inlet conductor 5 for the selective solvent, and a lower inlet conductor 6 for the charging stock to be treated in the system. These inlet conductors may be equipped with pumps 7 and 8 to force continuous streams of the solvent and charging oil into the extracting chamber. To aid in distributing the solvent, the inner end of the solvent conductor 5 may be provided with a flaring nozzle 9 having an annular outlet at its periphery. The inner end of the lower conductor 6 is likewise equipped with a flaring nozzle 10 having an annular outlet.

When the system is operating, the chamber 4 is approximately filled with liquid, and a continuous stream of the heavy extract is discharged through a pipe 11 leading from the lower end of said chamber, said discharge pipe being provided with a regulating valve 12. A continuous stream of the light raffinate is discharged through a pipe 13 leading from the upper portion of said chamber, and equipped with a regulating valve 14. A flaring deflector 15 may be located in the upper portion of the chamber 4 to receive the raffinate which flows over the inner edge of said deflector and passes to the discharge pipe 13.

In the system shown by Fig. 1, a relatively heavy selective solvent enters the upper portion of the extracting chamber and tends to flow downwardly, while the charging oil entering the lower portion of said chamber is relatively light, or it has relatively light constituents tending to rise from the inlet nozzle 10. This results in a counterflow wherein the descending solvent enters into the oil so as to select and dissolve the constituents to be extracted from the oil, the resultant heavy extract solution being discharged at the bottom through the pipe 11, while the lighter constituents rise to the top and flow out through the discharge pipe 13. However, it is to be understood that in some cases, the selective solvent will be lighter than the charging oil, and that the solvent will then rise through the oil. For convenience in the following description, and without limiting the invention to these conditions, we will assume that the selective solvent is relatively heavy, and that it is employed to extract naphthenic and aromatic compounds from paraffinic constituents of petroleum lubricating oil stocks. We may also assume that the selective solvent is dichlorethyl ether (chlorex), although any other suitable solvent may be employed.

In the use of selective solvents, one of the outstanding objects is to thoroughly mix the solvent with the charging stock, so that the solvent will effectively dissolve all of the constituents to be extracted. In actual practice, this involves time and repeated mixing and settling operations intended to expose all parts of the charging stock to the solvent, and permit separation of the resultant solutions.

We divide the oil and solvent into numerous relatively small streams and cause these streams to flow in intersecting paths, thereby exposing fine streams of the oil to the selective action of the counterflowing solvent, so as to permit free and positive extraction of the constituents to be removed from the oil.

To illustrate a suitable means for carrying out our method of mixing and settling the counterflowing streams, we have shown an alternating arrangement of baffles, or spreaders, in the form of rings which repeatedly divide the rising and descending liquids into annular streams. These rings are conveniently located in positions concentric with the extracting chamber 4, and they are arranged in alternating groups A and B. As shown most clearly in Figures 2 and 3, each group A consists of an outer ring 16 united with and extending inwardly from the inner face of the chamber 4, an intermediate ring 17 surrounded by said outer ring 16, and an inner ring 18 surrounded by said intermediate ring. Each group B consists of an outer ring 19 separated from the inner face of the chamber B, an intermediate ring 20 surrounded by said outer ring 19, and a central disk 21 surrounded by said intermediate ring 20.

In this alternating arrangement of groups A and B, each central disk 21 of group B lies between the central openings of adjacent higher and lower rings 18 in groups A, while the middle portion of the intermediate ring 20 lies between the higher and lower annular spaces formed between rings 17 and 18 of the adjacent groups A. The outer ring 19 of group B is likewise arranged between higher and lower annular spaces formed between rings 16 and 17 of the adjacent groups A. The rings of any given group preferably lie in the same horizontal plane, but they are separated from each other to provide annular spaces, and they are preferably, but not essentially, concentric with each other. To avoid unnecessary confusion, we have not shown supports for the rings, but it will be understood that the members of each group can be united in any suitable manner and attached to the chamber 4.

We will now refer to preliminary distributing zones wherein the incoming streams of solvent and charging stock advance step by step from one plane to another, while each incoming stream spreads into a series of annular streams, the number of said annular streams being progressively increased.

For example, at the lower portion of Fig. 3, the preliminary distribution of the rising material is indicated by dotted lines. An annular stream of incoming charging stock rises from the periphery of the spreading nozzle 10 to the middle portion of a ring 18' where it spreads toward the inner and outer edges of said ring 18'. As a consequence, the rising material is divided into two concentric annular streams, one rising from the outer edge of ring 18' while the other rises from the inner edge. The inner annular stream contacts with a central disk 21' where it spreads to a larger diameter and rises from the circular outer edge of said disk 21' to a higher ring 18'. Another spreading, or flattening, occurs at the bottom face of said higher ring 18', and we may assume that most of the liquid just referred to will rise as an annular stream from the inner edge of said higher ring 18' to the still higher central disk 21. This disk 21 forms part of the lowest complete group B.

Attention is now directed to the conditions beginning at the outer edge of the lowermost ring 18' in Fig. 3. The annular stream rising from this outer edge strikes the bottom of a higher ring 20' where it is flattened and divided into two concentric annular streams rising from the inner and outer edges of said ring 20', the inner annular stream being transmitted to the bottom of the higher ring 18', while the companion outer stream rises in an annular course from the outer edge of said ring 20' to the bottom face of a higher ring 17'. This rising stream is flattened on said bottom face and divided into two concentric annular streams which rise from the inner and outer edges of said ring 17', the inner stream being delivered to the bottom of a ring 20 while the outer stream is transmitted to the bottom of a ring 19. These rings 19 and 20 are associated with the disk 21 in the same plane to form the lowest complete group B.

We will now endeavor to approximately describe conditions of the rising material at the lowest complete group B, and it will be understood that similar conditions exist at each of the higher groups B. Throughout Fig. 3, the flow of the rising material is suggested by dotted lines, while the flow of descending material is suggested by the relatively thin full lines. At the lowest group B, the outer ring 19 receives an annular rising stream from the outer edge of the lower ring 17', said rising stream being flattened on the bottom face of ring 19 and divided into two annular streams which rise from the inner and outer edges of the ring 19 to the next adjacent higher rings 16 and 17 of group A. The annular stream rising from the outer edge of the last mentioned ring 19 is flattened on the next higher ring 16 and contracted into an annular stream of smaller diameter which rises from the inner edge of the ring 16 to the bottom of a still higher ring 19. Again referring to the ring 19 in the lowest complete group B, the annular stream rising from the inner edge of said ring 19 is flattened on the bottom of a higher ring 17, and most of this material will rise in the form of an annular stream from the outer edge of said ring 17 to the next higher ring 19. Still referring to the lowest complete group B, it will be observed that two annular streams rise from the inner and outer edges of the ring 20 to the next higher rings 17 and 18 where they are permitted to flow toward each other and rise to the next higher ring 20. The central disk 21 of the lowest complete group B receives an annular stream from the inner edge of a ring 18', said stream being flattened on the bottom of said central disk where it spreads to a larger diameter and then rises from the outer edge of the disk to the next higher ring 18 in one of the A groups.

After passing through all of the numerous alternating groups A and B, the lightest components of the rising material are eventually discharged from said groups in the form of concentric annular streams, as suggested by dotted lines at the upper portion of Fig. 3. Assuming that the charging stock is a lubricating oil stock, and that the object is to extract naphthenic compounds from paraffinic hydrocarbons, the lightest material will be the paraffinic oil containing a small percentage of the extracting solvent.

The incoming continuous stream of relatively heavy selective solvent is admitted through the spreading nozzle 9 at the upper portion of Fig. 3, and discharged in an annular stream from the periphery of said nozzle. The flow of this heavy descending solvent is suggested by the approximately diamond-shaped full lines in Fig. 3. However, it is to be understood that this illustration of the flow is merely a diagrammatical aid in pointing out the general directions of the flow, and that we are not attempting to illustrate or describe all of the details of the highly complex tortuous currents and countercurrents due to the numerous mixing and settling operations which occur throughout the system.

The preliminary distribution of the incoming solvent at the upper portion of Fig. 3 is similar to the distribution previously described in referring to the incoming charging stock. It will be understood that the solvent is gradually divided into a series of concentric annular streams as it flows downwardly from the nozzle 9 at the upper portion of Fig. 3 to the highest complete group of baffles B. At this highest group B, a large annular stream of solvent flows downwardly around the outer edge of the ring 19; a solvent stream of smaller diameter descends between the rings 19 and 20, and a stream of still smaller diameter descends betwen the ring 20 and disk 21. Thereafter, the heavy solvent flows between said highest complete group B and the next lower group A, and then downwardly in the form of annular streams including a stream between the rings 16 and 17 of said group A, another annular stream between the rings 17 and 18 and a stream descending through the central opening in said ring 18. The descending heavy solvent gradually advances through the numerous groups A and B, so as to effectively mix with and dissolve naphthenic constituents in the rising streams. The resultant heavy naphthenic solution is constantly discharged from the lower end of the system.

By referring to Fig. 3 it will now be understood that the incoming streams of solvent and charging stock are repeatedly divided into annular rising and descending streams at various elevations in the extracting chamber, the annular rising streams formed at each of said elevations being of different diameters but approximately concentric with, and separated from, each other. Relatively heavy annular descending streams of the solutions intersect and descend between separated annular rising streams at each of said elevations. The mixed light and heavy solutions are allowed to settle in approximately concentric annular settling zones between the groups of baffles A and B. The descending streams of heavy constituents spread and flow laterally toward opposite sides of each of the annular settling zones above the baffles 17, 18, 19, 20 and 21, so as to divide each of these annular streams into two lateral streams of different diameters, which flow across two approximately concentric rising streams. The descending lateral streams passing from one settling zone are merged with aproximately concentric lateral streams from other settling zones at the same elevation. It will also be observed that each of said descending lateral streams is transmitted across one of the rising streams before it merges into the lateral stream from another settling zone.

In extracting naphthenic compounds from lubricating oil stocks, the relatively light paraffinic solutions will readily flatten on the bottom faces of the baffles, thereby producing relatively thin films approximately as indicated by dotted lines in Fig. 3. These films are surrounded by and in direct contact with the counterflowing solvent, and they are effectively scrubbed by the annular solvent streams which flow across the numerous annular rising films.

We claim:

1. In the art of using selective solvents to extract constituents of hydrocarbon liquids, the countercurrent process which comprises transmitting continuous streams of the selective solvent and hydrocarbon liquid into different portions of an extracting chamber, dividing resultant solutions into approximately concentric annular rising and descending streams at different elevations in said extracting chamber, the annular rising streams formed at each of said elevations being of successively increasing diameters and separated from each other, and causing annular descending streams of said solutions to intersect and descend between separated rising streams of different diameters at each of said elevations.

2. In the art of using selective solvents to extract constituents of hydrocarbon liquids, the countercurrent process which comprises transmitting continuous streams of the selective solvent and hydrocarbon liquid into different portions of an extracting chamber, dividing resultant solutions into rising annular streams at different elevations in said extracting chamber, a series of said rising annular streams being formed at each of said elevations and the rising streams of each series being of different diameters and approximately concentric with each other, and causing annular descending streams of said solutions to intersect and contact with approximately concentric rising streams at each of said elevations.

3. In the art of using selective solvents to extract constituents of hydrocarbon liquids, the countercurrent process which comprises transmitting continuous streams of the selective solvent and hydrocarbon liquid into different portions of an extracting chamber, dividing resultant solutions into annular rising and descending streams at various elevations in said extracting chamber, the annular rising streams formed at each of said elevations being approximately concentric with, but separated from each other, causing annular descending streams of the solutions to intersect and descend between separated rising annular streams at each of said elevations, allowing mixed light and heavy solutions to settle in annular zones between said elevations, and causing descending heavy constituents to flow laterally toward opposite sides of each of said annular settling zones, so as to divide each of said annular descending streams into two lateral streams which flow across and mix with two of said separated rising annular streams.

4. In the art of using selective solvents to extract constituents of hydrocarbon liquids, the countercurrent process which comprises transmitting continuous streams of the selective solvent and hydrocarbon liquid into different portions of an extracting chamber, dividing resultant solutions into annular rising and descending streams at various elevations in said extracting chamber, the annular rising streams formed at each of said elevations being of different diameters but approximately concentric with, and separated from, each other, causing relatively heavy annular descending streams of the solutions to intersect and descend between separated rising annular streams at each of said elevations, allowing mixed light and heavy solutions to settle in approximately concentric annular settling zones between said elevations, causing descending heavy constituents to spread and flow laterally toward opposite sides of each of said annular settling zones, so as to divide each of said annular descending streams into two lateral streams of different diameters which flow across two of said approximately concentric annular rising streams, the lateral streams passing from one settling zone being merged with approximately concentric lateral streams from other settling zones at the same elevation, two separated rising streams being formed between adjacent settling zones, and each of said lateral streams being transmitted into one of the last mentioned rising streams before it merges into the lateral stream from another settling zone.

5. In the art of using selective solvents to extract constituents of hydrocarbon liquids, the countercurrent process which comprises transmitting continuous streams of the selective solvent and hydrocarbon liquid into different portions of an extracting chamber, causing resultant light and heavy solutions to advance step by step in opposite directions from one elevation to another, maintaining a series of separated but approximately concentric annular rising streams of successively increasing diameters at each of said elevations, spreading said rising streams toward and away from the center of said chamber as they advance from one of said elevations so as to convert the rising annular streams into annular streams of different diameters at the next higher elevation, and causing annular descending streams of solution to intersect and descend between separated annular streams at each of said elevations.

6. In the art of using selective solvents to extract naphthenic compounds from lubricating oil stocks, the countercurrent process which comprises transmitting a continuous stream of the selective solvent into an extracting chamber while transmitting a continuous stream of lubricating oil stock into a lower portion of said chamber, dividing resultant solutions into numerous approximately concentric annular streams of different diameters rising at different elevations in said extracting chamber, the annular rising streams formed at each of said elevations being separated from each other, and causing annular descending streams of selective solvent to flow across and descend between separated rising streams at each of said elevations.

7. In the art of using selective solvents to extract naphthenic compounds from hydrocarbon liquids, the countercurrent process which comprises transmitting continuous streams of the selective solvent and hydrocarbon liquid into different portions of an extracting chamber, dividing resultant solutions into numerous annular rising streams and numerous descending streams of the solvent and naphthenic compounds at various elevations in said extracting chamber, the annular rising streams formed at each of said elevations being approximately concentric with, but separated from each other, causing annular descending streams of said solvent and naphthenic compounds to intersect and descend between separated rising streams at each of said elevations, allowing the resultant mixtures to settle in annular settling zones between said elevations, and causing descending heavy constituents to flow laterally toward opposite sides of each of said annular settling zones so as to divide each of said anular descending streams into two streams of different diameters which flow across two of said separated rising annular streams.

8. In the art of using selective solvents to extract constituents of hydrocarbon liquids, the countercurrent process which comprises transmitting continuous streams of selective solvent and hydrocarbon liquid into different portions of an extracting chamber, causing the incoming streams of solvent hydrocarbon liquid to advance step by step from one plane to another through preliminary distributing zones, while spreading each incoming stream into a series of annular streams, the number of said annular streams being progressively increased as the incoming materials advance in said preliminary distributing zones, so as to gradually divide resultant incoming solutions into a series of rising annular streams and a series of relatively heavy annular descending streams, causing the rising solutions to advance step by step from one elevation to another while maintaining a plurality of separated annular rising streams at each of said elevations, and causing descending annular streams of the solutions to intersect and descend between separated annular rising streams at each of said elevations.

EDDIE M. DONS.
OSWALD G. MAURO.